April 26, 1955  S. B. GRISCOM  2,707,241
POWER FACTOR REGULATORS
Filed Sept. 25, 1952  2 Sheets-Sheet 2

WITNESSES:
John E. Hensley
K. H. Thomas

INVENTOR
Samuel B. Griscom
BY
Ezra W. Savage
ATTORNEY

United States Patent Office 2,707,241
Patented Apr. 26, 1955

2,707,241

POWER FACTOR REGULATORS

Samuel B. Griscom, Pittsburgh, Pa., assignor to Westinghouse Electric Corporation, East Pittsburgh, Pa., a corporation of Pennsylvania Application September 25, 1952, Serial No. 311,351

8 Claims. (Cl. 307—57)

This invention relates to regulators and more particularly to regulators that function as both a voltage and a power factor regulator.

When a transmission line has connected to its input and load end synchronous machines operating in parallel, certain problems are involved. For instance, the synchronous machines connected to the load end of the transmission line tend to maintain the voltage across the load substantially constant, irrespective of other existing conditions. However, in order to maintain this voltage across the load substantially constant, the synchronous machine will under given conditions increase its reactive power output, while the synchronous machine connected to the input end of the transmission line will only increase its real power output. Thus, it is desirable to provide control means for requiring the synchronous machine connected to the input end of the transmission line to supply its share of the reactive power instead of requiring the synchronous machines connected to the load end of the transmission line to supply the greater portion of the reactive power needed. If such control means is not provided, the synchronous machines connected to the load end of the transmission line must be capable of supplying this needed reactive power to the economic detriment of the overall system.

An object of this invention is to provide for controlling the amount of reactive power supplied by two parallel operated synchronous machines or systems which are connected to the input and load end, respectively, of a transmission line, by maintaining the power factor of the load end of the transmission line substantially constant, thereby requiring the synchronous machine connected to the input end of the transmission line to supply a predetermined share of reactive power, thus holding the size of the synchronous machine connected to the load end of the transmission line to a minimum.

Another object of this invention is to provide for controlling the amount of reactive power supplied by two parallel operated synchronous machines or systems which are connected to the input and load end, respectively, of a transmission line, by utilizing a voltage varying device responsive to a power factor regulator to effect a predetermined division of reactive power supplied by the synchronous machines, thereby holding the size of the synchronous machine connected to the load end of the transmission line to a minimum.

A further object of this invention is to provide for maintaining the power factor of a transmission line supplied by a synchronous machine substantially constant by providing a power factor regulator which varies the voltage drop in the transmission line in response to the current flow therethrough to thereby vary the reactive power delivered by the transmission line and thus maintain the power factor substantially constant.

A more specific object of this invention is to provide for maintaining the power factor of a transmission line, having a synchronous machine connected to its input and load end, respectively, substantially constant, by obtaining a measure of the voltage across the transmission line and a voltage measure of the current flow therethrough which varies its phase angle with respect to the measure of the voltage to produce a resultant of the two measures for controlling the magnitude of the open circuit voltage across the load end of the transmission line to thereby control the magnitude of the reactive power supplied by the synchronous machine connected to the input end of the transmission line, thus maintaining the power factor of the load end of the transmission line substantially constant.

A still further object of this invention is to provide for maintaining both the power factor of and the voltage across a transmission line substantially constant.

Other objects of this invention will become apparent from the following description when taken in conjunction with the accompanying drawings, in which.

Figure 1:
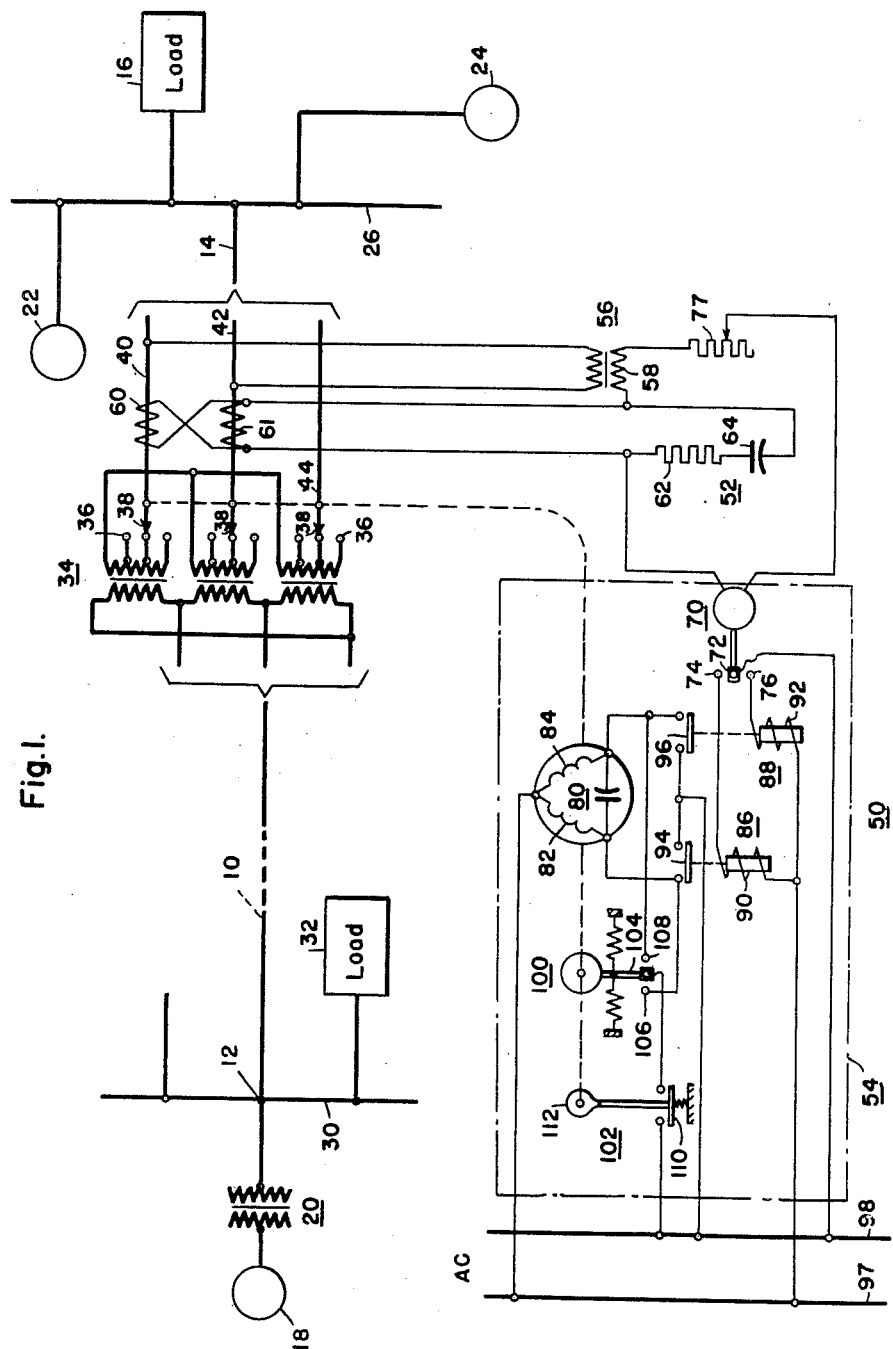
Figure 1 is a schematic diagram illustrating an embodiment of the teachings of this invention.

In the interest of simplicity, in the figures the greater portion of the three-phase transmission line or system 10 is illustrated in single line diagram form. As shown in Fig. 1 the transmission line 10 has an input end 12 and a load end 14.

The manner in which the components of the system are connected will now be described generally and the functioning and operation of the system will follow. In order to supply energy to a load 16, a synchronous generator 18 is electrically connected to the input end 12 of the transmission line 10 through a bank of transformers 20. On the other hand, a synchronous condenser 22 and a synchronous generator 24 are electrically connected to the load end 14 of the transmission line 10 through a bus bar 26, the synchronous condenser 22 and the synchronous generators 18 and 24 being operated in parallel. However, it is to be understood that either the synchronous condenser 22 or the generator 24 or both can be present in the actual system, As illustrated, the load 16 is also electrically connected to the bus bar 26. In this instance, a bus bar 30 is electrically connected to the input end 12 of the transmission line 10, a load 32 in turn being electrically connected to the bus bar 30.

As illustrated, a tap changing transformer 34 having stationary contact members 36 and movable contact members 38 is electrically connected between the input end 12 and the load end 14 of the transmission line 10. The movable contact members 38 are electrically connected to the three-phase transmission line 10 which comprises the line conductors 40, 42 and 44. However, for the purpose of simplifying the description, the line conductors 40, 42 and 44 shall hereinafter be referred to in the specification and claims as the first, second, and third phases, respectively, of the transmission line 10.

In order to maintain the power factor of the load end 14 of the transmission line 10 substantially constant, and thereby require the generator 18 to supply a predetermined share of reactive power irrespective of the magnitude of its real power output, a power factor regulator 50 is provided. The power factor regulator 50 comprises two main components, a power sensing network 52 for sensing the voltage across and the current flow through the load end 14 of transmission line 10, and a control network 54 for effecting the actuation of the movable contact members 38 of the tap changing transformer 34 to thereby increase or decrease the open circuit voltage appearing across the load end 14 of transmission line 10. As will be explained hereinafter the power factor regulator 50 also functions as a voltage regulator.

Figure 2:
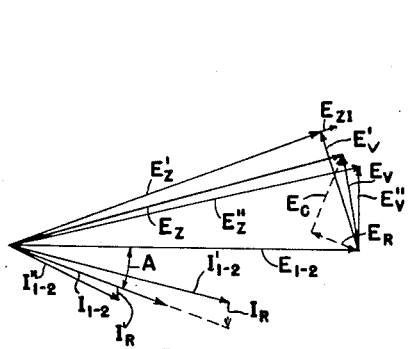
Fig. 2 is a vector diagram illustrating the voltages obtained by means of a power sensing circuit illustrated in Fig. 1.

Referring more particularly to the power sensing network 52, a measure of the voltage appearing between the first and second phases of the load end 14 of the transmission line 10 is obtained by connecting a potential transformer 56, having a secondary winding 58, across these two phases. However, in order to obtain a measure of the combined current flow through the first and second phases of the load end 14 of the transmission line 10, current transformers 60 and 61 are inductively associated with the first and second phases, respectively, of the transmission line 10. The current transformers 60 and 61 in turn have electrically connected across them a series connected resistor 62 and capacitor 64, the function of which can more clearly be seen by reference to Fig. 2 of the drawings. As illustrated in Fig. 2, the measure of the voltage appearing between the first and second phases of the load end of the transmission line 10 is represented by a vector $E_{1-2}$. Thus, the power factor angle for the load end 14 of the transmission line 10 is represented by the angle A between the voltage vector $E_{1-2}$ and its associated current vector $I_{1-2}$, and it is this angle that must remain substantially constant in order for the generator 18 to supply its share of reactive power.

When current flows through the resistor 62 and the capacitor 64 of the power sensing network 52, a voltage is produced across the resistor 62 as represented by the voltage vector $E_R$, which vector is in phase and thus parallel with the current vector $I_{1-2}$ and in an opposite sense to the vector $I_{1-2}$ since the current flow through the resistor 62 is opposite in direction to that current flow through the secondary winding 58 of the transformer 56. On the other hand, the current flow through the capacitor 64 produces a voltage which is represented by the voltage vector $E_C$, which lags the voltage vector $E_R$ by 90° or in other words is in leading quadrature phase relationship with respect to the current vector $I_{1-2}$. The vector resultant of the voltages $E_C$ and $E_R$ is illustrated by a vector $E_V$ and this is the voltage that appears across the resistor 62 and capacitor 64 combined.

In order to obtain a voltage that is the resultant of the voltage appearing across the secondary winding 58 of the transformer 56 and the voltage appearing across the resistor 62 and the capacitor 64 combined, one end of the secondary winding 58 is electrically connected to one terminal of the capacitor 64. This resultant voltage can more clearly be seen by again referring to Fig. 2, where it is represented by the vector $E_z$, which represents the vector resultant of the voltages $E_{1-2}$ and $E_v$. It is to be noted that the resultant voltage $E_z$ is applied to the control network 54 to effect an operation of the tap changing transformer 34, to thereby maintain the power factor of the load end 14 of the transmission line 10 substantially constant.

Although a particular control network 54 has been illustrated for effecting an actuaion of the tap changing transformer 34, it is to be understood that any suitable control network (not shown) could be utilized in the place of the one illustrated. In this instance, the control network 54 comprises a contact-making voltmeter or relay 70 having a movable contact member 72 and opposed stationary contact members 74 and 76, the contact-making voltmeter 70 being disposed to be energized by the resultant voltage $E_z$, the magnitude of which voltage can be varied by means of a resistor 77.

In order to effect a tap change of the tap changing transformer 34, a single phase capacitor motor 80, having armature windings 82 and 84, is mechanically connected to the movable contact members 38 of tap changing transformer 34 and for the purpose of energizing the armature windings 82 and 84 of the motor 80, relays 86 and 88, respectively, are provided. As illustrated, the relays 86 and 88 comprise energizing windings 90 and 92, respectively, and movable contact members 94 and 96, respectively. In this instance, the energizing windings 90 and 92 receive alternating current from an alternating current source of supply (not shown) connected to the conductors 97 and 98.

In order to establish a holding circuit for the motor 80 and thereby insure that the tap changing transformer 34 is actuated through at least one complete tap changing step, a spring biased centrifugal switch 100 and a cam operated contactor 102 are provided. In this instance, the centrifugal switch 100 comprises a movable contact member 104 and opposed stationary contact members 106 and 108. On the other hand, the cam operated contactor 102 comprises a spring biased movable contact member 110 and a cam member 112. As illustrated, the cam member 112 and the centrifugal switch 100 are mechanically connected to the motor 80, the cam member 112 making one complete revolution for each tap changing step of the tap changing transformer 34.

In operation, assuming the real power supply by the generator 18 increases, the magnitude of the current represented by the vector $I_{1-2}$ illustrated in Fig. 2 likewise increases. Not only does the magnitude of the current $I_{1-2}$ increase, but the power factor angle A decreases. This new current associated with the voltage $E_{1-2}$ is represented by the current vector $I'_{1-2}$. Since the current vector $I_{1-2}$ has assumed this new position, the resultant voltage vector $E_V$ will likewise assume a different position as represented by the voltage vector $E'_V$. As can be seen from Fig. 2 the resultant of the vectors $E_{1-2}$ and $E'_V$ as represented by the voltage vector $E'_z$ is of smaller magnitude than the resultant voltage as represented by the voltage vector $E_z$.

With a decrease in the magnitude of the resultant voltage $E_z$, as applied to the contact-making voltmeter 70, the movable contact member 72 of the contact-making voltmeter 70 is actuated into circuit closing position with respect to its associated stationary contact member 76. When the movable contact member 72 and the stationary contact member 76 are in circuit closing position, an energizing circuit is established for the energizing winding 92 of the relay 88 to thereby actuate its movable contact member 96 into circuit closing position and thereby establish an energizing circuit for the armature winding 84 of the motor 80 which extends from the conductor 98 through the movable contact member 96 of the relay 88 and the armature winding 84 of the motor 80 to the conductor 97. Once the energizing circuit for the armature winding 84 is completed, the motor 80 rotates in such a direction as to actuate the movable contact members 38 of the tap changing transformer 34 in a direction to increase the open circuit voltage appearing across the load end 14 of the transmission line 10.

As soon as the motor 80 starts rotating and thereby rotates the centrifugal switch 100 and the cam member 112 of the cam actuated contactor 102, two actions take place. First, the spring biased movable contact member 110 of the contactor 102 is biased into circuit closing position and second the movable contact member 104 of the centrifugal switch 100 is actuated into circuit closing position with its associated stationary contact member 108 to thereby establish a holding circuit for the armature winding 84 of the motor 80 and thus insure at least one complete tap changing step of the tap changing transformer 34.

If the magnitude of the resultant voltage $E_z$ returns to its normal magnitude before or when one complete tap changing step has been completed, then, since the movable contact member 110 of the contactor 102 is in the circuit interrupting position, and the movable contact member 72 of the contact-making voltmeter 70 is likewise not in circuit engagement with either of its associated stationary contact members 74 and 76, the armature winding 84 of the motor 80 is deenergized thus preventing any further increase in the magnitude of the open circuit voltage across the load end 14 of the transmission line 10. However, if the resultant voltage $E_z$ is still below its normal magnitude, then the relay 88 will remain energized and the holding circuit hereinbefore referred to will again be reestablished and one or more further tap changing steps will be effected until the resultant voltage $E_z$ returns to its normal value.

When the magnitude of the open circuit voltage across the load end 14 of the transmission line 10 is increased as hereinbefore mentioned due to a decrease in the magnitude of the resultant voltage $E_z$, more reactive power is delivered to the transmission line 10 by the generator 18. This increase in reactive power received from the generator 18 adds a reactive component of current $I_R$ to the current $I'_{1-2}$ to thereby increase the power factor angle to its original value as represented by the angle A, thereby maintaining the power factor of the load end 14 of the transmission line 10 substantially constant. In addition, an increment of voltage $E_{ZI}$ is added to $E'_z$, such that the magnitude of $E'_z$ becomes substantially equal to $E_z$ and the magnitude of the voltage $E_z$ is thus returned to substantially its normal magnitude.

On the other hand, assuming there is a decrease in the real power supplied by the generator 18 to the transmission line 10, the current, as represented by the current $I_{1-2}$, decreases in magnitude and the power factor angle A increases in magnitude, as represented by the current vector $I''_{1-2}$. An increase in the power factor angle A results in a repositioning of the resultant voltage vector $E_V$ to a position as represented by the resultant voltage $E''_V$. A decrease in the current $I_{1-2}$ also decreases the magnitude of the voltage $E_V$. With an increase in the resultant voltage $E_z$, as represented by the voltage vector $E''_z$, as applied to the contact-making voltmeter 70, the movable contact member 72 is actuated into circuit closing position with its associated stationary contact member 74. This latter action completes an energizing circuit to the energizing winding 90 of the relay 86 which extends from the conductor 97 through the energizing winding 90, the stationary contact member 74 and the movable contact member 72, to the conductor 98, to thereby actuate the movable contact member 94 of the relay 86 to the circuit closing position. With the movable contactor member 94 in the circuit closing position, an energizing circuit is established for the armature winding 82 of the motor 80 which extends from the conductor 98 through the movable contact member 94 and the armature winding 82 to the conductor 97. On energizing the armature winding 82, a rotation of the motor 80 is effected to thereby actuate the movable contact member 104 of the centrifugal switch 100 into circuit closing position with its associated stationary contact member 106 and actuate the movable contact member 110 of the contactor 102 into the circuit closing position to thus establish a holding circuit for the armature winding 82 which extends from the conductor 98 through the movable contact member 110, the movable contact member 104, the stationary contact member 106, and the armature winding 82, to the conductor 97.

As long as the movable contact member 72 of the contact-making voltmeter 70 remains in circuit closing position with its associated stationary contact member 74, the motor 80 continues to rotate to thereby decrease the magnitude of the open circuit voltage across the load end 14 of the transmission line 10. However, when the open circuit voltage across the load end 14 of the transmission line 10 decreases, the amount of reactive current $I'_R$ supplied to the transmission line 10 by the generator 18 likewise decreases to thereby effect a rotation of the current vector $I''_{1-2}$ to a phase position corresponding to the current vector $I_{1-2}$ thereby maintaining the power factor of the load end 14 of the transmission line 10 substantially constant. At the same time the voltage $E''_z$ decreases in magnitude until at the regulated or normal value it becomes substantially equal in magnitude to the voltage $E_z$.

Figure 3:
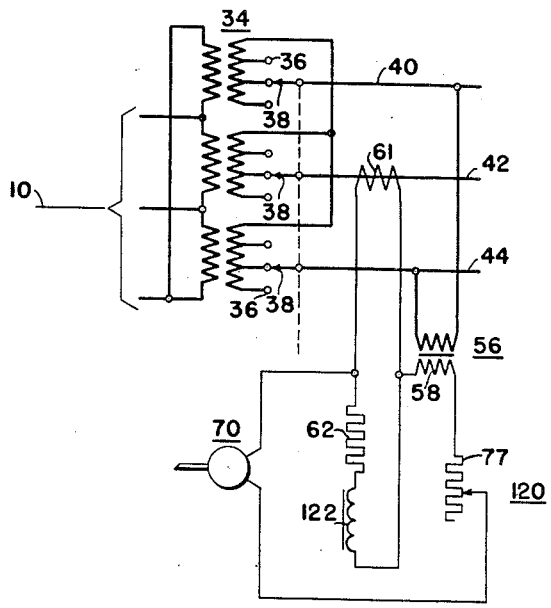
Fig. 3 is a schematic diagram illustrating another embodiment of the teachings of this invention.

Referring to Fig. 3, there is illustrated another embodiment of this invention in which for purposes of simplifying the description, only a power sensing network 120 corresponding to the power sensing network 52 of Fig. 1 and the tap changing transformer 34 are illustrated. Also for purposes of simplifying the description, like components of Figs. 1 and 3 have been given the same reference character. The main distinction between the apparatus illustrated in Figs. 1 and 3 is that in the apparatus of Fig. 3 the potential transformer 56 is connected across the first and third phases of the load end of the transmission line 10 instead of across the first and second phases as illustrated in Fig. 1. In addition, an inductance member 122 is substituted for the capacitor 64 as illustrated in Fig. 1 and the current transformer 60 illustrated in Fig. 1 is omitted from the apparatus illustrated in Fig. 3.

Figure 4:
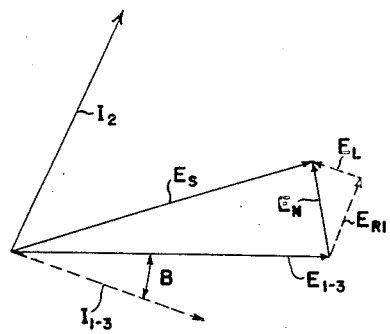
Fig. 4 is a vector diagram representing the voltages obtained by means of the power sensing circuit illustrated in Fig. 3.

By referring to Fig. 4, the effect obtained by making the above mentioned changes, as illustrated in Fig. 3, can be more readily seen. For instance, the voltage across the first and third phases of the load end 14 of the transmission line 10 is represented by a voltage vector $E_{1-3}$ and its associated current by a current vector $I_{1-3}$, the power factor angle between the voltage $E_{1-3}$ and the current $I_{1-3}$ being represented by the angle B. In the apparatus of Fig. 3 it is to be noted that the current flows instantaneously in the same direction through the resistor 62 and inductance member 122 as it does through the secondary winding 58 of the transformer 56. Such being the case, the voltage across the resistor 62 in the apparatus of Fig. 3, is represented by the voltage vector $E_{R1}$ which is in phase with and thus parallel with the current vector $I_2$ which represents the current flowing in the second phase of the load end 14 of the transmission line 10. In other words the voltage vector $E_{R1}$ is in leading quadrature phase relationship with respect to the current vector $I_{1-3}$. The voltage across the inductance member 122 is positioned in a leading position with respect to the voltage vector $E_{R1}$ as represented by the voltage vector $E_L$. In other words the voltage vector $E_L$ is in phase and opposite in sense to the current vector $I_{1-3}$. The resultant of the voltage vectors $E_L$ and $E_{R1}$ is represented by a voltage vector $E_N$ which represents the voltage across the resistor 62 and inductance member 122 combined. However, the combined voltage across the resistor 62, inductance member 122 and the secondary winding 58 of the transformer 56 is represented by the resultant voltage vector $E_s$. The resultant voltage $E_s$ corresponds to the resultant voltage $E_z$ as illustrated in Fig. 2. Since the resultant voltage $E_s$ of the apparatus of Fig. 3 and the resultant voltage $E_z$ of the apparatus of Fig. 1 change their magnitude in the same manner under similar conditions, it is not deemed necessary to describe in detail the operation of the apparatus of Fig. 3, such operation having been described with reference to the apparatus of Fig. 1.

It is to be noted that the apparatus illustrated in Figs. 1 and 3 in addition to maintaining the power factor at the load end 14 of the transmission line 10 substantially constant, also maintains the voltage across the bus bar 26 substantially constant if there should be a failure of the synchronous condenser 22 or the generator 24 or both. With regard to the apparatus of Fig. 1, this can be more readily seen with reference to Fig. 2. For instance, if the magnitude of the voltage vector $E_{1-2}$ decreases, the magnitude of the voltage vector $E_z$ likewise decreases to thereby effect an operation of the control network 50 to increase the magnitude of the voltage across the load end 14 of the transmission line 10 to substantially its normal value as hereinbefore described. On the other hand, the effect of a decrease in the magnitude of the voltage across the load end 14 of the transmission line 10 regarding the apparatus illustrated in Fig. 3 can be best seen by reference to Fig. 4. Such a decrease in the voltage across the load end 14 of the transmission line 10 decreases the magnitude of the voltage vector $E_{1-3}$ thus decreasing the magnitude of the voltage vector $E_s$ to thereby effect an operation of the control network 50 and thus return the magnitude of the voltage across the load end 14 of the transmission line 10 to substantially its normal value.

With reference to the apparatus of Fig. 1, it is to be understood that the current transformers 60 and 61 can be associated with any two phases of the load end 14 of three-phase transmission line 10, the potential transformer 56 being electrically connected across the corresponding two phases. In like manner, with reference to Fig. 3, the current transformer 61 can be associated with any one of the three phases of the load end 14 of the three-phase transmission line 10, the potential transformer 56 being electrically connected across the other two phases of the load end 14 of the three-phase transmission line 10.

Since numerous changes may be made in the above-described circuits and apparatus and since different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a power factor regulator for a transmission line receiving power from a tap-changing transformer, the combination comprising, means for obtaining a measure of the voltage across the transmission line, means for obtaining a measure of the current flow through the transmission line, electrical means responsive to said measure of the current flow for generating a predetermined voltage measure of said current flow having a predetermined relative magnitude and phase relationship between said measure of the current flow and said measure of the voltage across the transmission line, said electrical means being such that one component of said predetermined voltage measure is in phase and opposite in sense with respect to said meaure of the current flow, and the other component of said predetermined voltage measure is in leading quadrature phase relationship with respect to said measure of the current flow, circuit means for combining said predetermined voltage measure and said measure of the voltage across the transmission line to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the transmission line substantially constant.

2. In a power factor regulator for a transmission line receiving power from a tap-changing transformer, the combination comprising, means for obtaining a measure of the voltage across the transmission line, means for obtaining a measure of the current flow through the transmission line, electrical means including a resistor and a capacitor responsive to said measure of the current flow for generating a predetermined voltage measure of said current flow having a predetermined relative magnitude and phase relationship between said measure of the current flow and said measure of the voltage across the transmission line, said electrical means being such that one component of said predetermined voltage measure is in phase and opposite in sense with respect to said measure of the current flow, and the other component of said predetermined voltage measure is in leading quadrature phase relationship with respect to said measure of the current flow, circuit means for combining said predetermined voltage measure and said measure of the voltage across the transmission line to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the transmission line substantially constant.

3. In a power factor regulator for a transmission line receiving power from a tap-changing transformer, the combination comprising, means for obtaining a measure of the voltage across the transmission line, means for obtaining a measure of the current flow through the transmission line, electrical means including a resistor and an inductance member responsive to said measure of the current flow for generating a predetermined voltage measure of said current flow having a predetermined relative magnitude and phase relationship between said measure of the current flow and said measure of the voltage across the transmission line, said electrical means being such that one component of said predetermined voltage measure is in phase and opposite in sense with respect to said measure of the current flow, and the other component of said predetermined voltage measure is in leading quadrature phase relationship with respect to said measure of the current flow, circuit means for combining said predetermined voltage measure and said measure of the voltage across the transmission line to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the transmission line substantially constant.

4. In a power factor regulator for a three-phase transmission line receiving power from a tap-changing transformer, the combination comprising, means for obtaining a measure of the voltage across two adjacent phases of the three-phase transmission line, means for obtaining a measure of the combined current flow through the two adjacent phases, electrical means including a resistor and capacitor responsive to said measure of the combined current flow through the two adjacent phases for generating a predetermined voltage measure of said combined current flow having a predetermined relative magnitude and phase relationship between said measure of the combined current flow and said measure of the voltage across two adjacent phases, said electrical means being such that one component of said predetermined voltage measure is in phase and opposite in sense with respect to said measure of the combined current flow, and the other component of said predetermined voltage measure is in leading quadrature phase relationship with respect to said measure of the combined current flow, circuit means for combining said measure of the voltage across two adjacent phases and said predetermined voltage measure of the combined current flow to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the three-phase transmission line substantially constant.

5. In a power factor regulator for a three-phase transmission line receiving power from a tap-changing transformer, the combination comprising, means for obtaining a measure of the voltage across two of the three phases of the three-phase transmission line, means for obtaining a measure of the current flow through the other phase of the three-phase transmission line, electrical means including a resistor and an inductance member responsive to said measure of the current flow through said other phase for generating a predetermined voltage measure of said current flow through said other phase having a predetermined relative magnitude and phase relationship between said measure of the current flow through said other phase and said measure of the voltage across two of the three phases, said electrical means being such that one component of said predetermined voltage measure is in phase and opposite in sense with respect to said measure of the current flow, and the other component of said predetermined voltage measure is in leading quadrature phase relationship with respect to said measure of the current flow, circuit means for combining said measure of the voltage across two of the three phases and said predetermined voltage measure of said current flow through said other phase to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the three-phase transmission line substantially constant.

6. In an electrical system for controlling the amount of reactive power supplied by two parallel operated synchronous machines which are connected to the input and load end, respectively, of a transmission line having interposed between its input and load end a tap-changing transformer, the combination comprising, means for obtaining a measure of the voltage across the load end of the transmission line, means for obtaining a measure of the current flow through the load end of the transmission line, electrical means responsive to said measure of the current flow for generating a predetermined voltage measure of said current flow having a predetermined relative magnitude and phase relationship between said measure of the current flow and said measure of the voltage across the load end of the transmission line, said electrical means being such that one component of said predetermined voltage measure is in phase and opposite in sense with respect to said measure of the current flow, and the other component of said predetermined voltage measure is in leading quadrature phase relationship with respect to said measure of the current flow, circuit means for combining said predetermined voltage measure of said current flow and said measure of the voltage across the load end of the transmission line to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the load end of the transmission line substantially constant.

7. In an electrical system for controlling the amount of reactive power supplied by two parallel operated synchronous machines which are connected to the input and load end, respectively, of a three-phase transmission line having interposed between its input and load end a tap-changing transformer, the combination comprising, means for obtaining a measure of the voltage across two adjacent phases of the three-phase transmission line, means for obtaining a measure of the combined current flow through the two adjacent phases of the three-phase transmission line, electrical means including a resistor and capacitor responsive to said measure of the combined current flow through the two adjacent phases for generating a predetermined voltage measure of said combined current flow having a predetermined relative magnitude and phase relationship between said measure of the combined current flow and said measure of the voltage across two adjacent phases, said electrical means being such that one component of said predetermined voltage measure is in phase and opposite in sense with respect to said measure of the combined current flow, and the other component of said predetermined voltage measure is in leading quadrature phase relationship with respect to said measure of the combined current flow, circuit means for combining said measure of the voltage across two adjacent phases and said predetermined voltage measure of said combined current flow to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the load end of the three-phase transmission line substantially constant.

8. In an electrical system for controlling the amount of reactive power supplied by two parallel operated synchronous machines which are connected to the input and load end, respectively, of a three-phase transmission line having interposed between its input and load end a tap-changing transformer, the combination comprising, means for obtaining a measure of the voltage across two of the three phases of the three-phase transmission line, means for obtaining a measure of the current flow through the other phase of the three-phase transmission line, electrical means including a resistor and an inductance member responsive to said measure of the current flow through said other phase for generating a predetermined voltage measure of said current flow through said other phase having a predetermined relative magnitude and phase relationship between said measure of the current flow through said other phase and said measure of the voltage across two of the three phases, said electrical means being such that one component of said predetermined voltage measure is in phase and opposite in sense with respect to said measure of the current flow, and the other component of said predetermined voltage measure is in leading quadrature phase relationship with respect to said measure of the current flow, circuit means for combining said measure of the voltage across two of the three phases and said predetermined voltage measure of said current flow through said other phase to thereby obtain a resultant voltage, a relay responsive to said resultant voltage, control means responsive to the relay and disposed to actuate the tap-changing transformer to thereby vary the tap-changing transformer open circuit voltage ratio in a manner to maintain the power factor of the load end of the three-phase transmission line substantially constant.

References Cited in the file of this patent

UNITED STATES PATENTS

| | | |
|---|---|---|
| 2,079,488 | Champlin | May 4, 1937 |
| 2,137,877 | Kramer | Nov. 22, 1938 |